US007469357B2

(12) United States Patent
Abernathy et al.

(10) Patent No.: US 7,469,357 B2
(45) Date of Patent: *Dec. 23, 2008

(54) METHOD AND APPARATUS FOR DYNAMIC POWER MANAGEMENT IN AN EXECUTION UNIT USING PIPELINE WAVE FLOW CONTROL

(75) Inventors: Christopher Michael Abernathy, Austin, TX (US); Gilles Gervais, Austin, TX (US); Rolf Hilgendork, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 11/552,790

(22) Filed: Oct. 25, 2006

(65) Prior Publication Data

US 2007/0050652 A1    Mar. 1, 2007

Related U.S. Application Data

(63) Continuation of application No. 10/042,082, filed on Jan. 7, 2002, now Pat. No. 7,137,013.

(51) Int. Cl.
*G06F 1/04* (2006.01)

(52) U.S. Cl. .................... 713/600; 713/300; 713/601

(58) Field of Classification Search ............... 713/300, 713/600, 601
See application file for complete search history.

(56) References Cited

U.S. PATENT DOCUMENTS

| 5,783,958 | A | 7/1998 | Lysinger |
| 5,889,979 | A | 3/1999 | Miller et al. |
| 5,987,620 | A | 11/1999 | Tran |
| 6,304,125 | B1 | 10/2001 | Sutherland |
| 6,393,579 | B1 | 5/2002 | Piazza |
| 6,553,473 | B1 | 4/2003 | Gaskins et al. |
| 6,564,328 | B1 | 5/2003 | Grochowski et al. |
| 6,611,920 | B1 | 8/2003 | Fletcher et al. |
| 6,629,250 | B2 | 9/2003 | Kopser et al. |
| 6,651,176 | B1 | 11/2003 | Soltis et al. |
| 2002/0103962 | A1 | 8/2002 | Toda |
| 2002/0116181 | A1 | 8/2002 | Khan et al. |
| 2002/0138777 | A1 | 9/2002 | Feierbach |

*Primary Examiner*—Tse Chen
(74) *Attorney, Agent, or Firm*—Carr LLP; Matt Talpis

(57) ABSTRACT

Power is conserved by dynamically applying clocks to execution units in a pipeline of a microprocessor. A clock to an execution unit is applied only when an instruction to the execution unit is valid. At other times when the execution unit needs not to be operational, the clock is not applied to the execution unit. In a preferred embodiment of the invention, a dynamic clock-control unit is used to provide a control signal to a local clock buffer providing a local clock to an execution unit.

6 Claims, 3 Drawing Sheets

METHOD AND APPARATUS FOR DYNAMIC POWER MANAGEMENT IN AN EXECUTION UNIT USING PIPELINE WAVE FLOW CONTROL

CROSS-REFERENCE TO RELATED APPLICATIONS

This application is a continuation of, and claims the benefit of the filing date of, U.S. patent application Ser. No.. 10/042,082 entitled METHOD AND APPARATUS FOR DYNAMIC POWER MANAGEMENT IN AN EXECUTION UNIT USING PIPELINE WAVE FLOW CONTROL, filed Jan. 7,2002 now U.S. Pat. No. 7,137,013.

BACKGROUND OF THE INVENTION

1. Field of the Invention

The invention relates generally to a clock scheme in a microprocessor and, more particularly, to dynamic power management in an execution unit of a microprocessor using pipeline wave flow control.

2. Description of the Related Art

Today's microprocessors designed in CMOS technology dissipate more and more power. Thus, cooling microprocessors, as well as supplying sufficient power, becomes a challenge. In CMOS technology, power dissipation is due to charging and discharging capacitances introduced by a following stage of circuits and the connecting wires. Typically, power dissipation 'P' is proportional to the frequency 'f' of switching the capacitive load of all circuits and is also proportional to the square of the supply voltage '$V_t$'. Thus, $P \alpha f*V_t**2$.

In addition, as processor speeds increase, execution units within a processor must implement deeper pipelines in order to meet the smaller cycle times. This represents an increase in the amount of power needed due to register clocking and switching. However, execution units typically do not operate at 100% utilization, but operate at 10-20% utilization. Thus, much of this power usage is unnecessary. That is to say, for at least 80% of the time when there are no instructions flowing in the pipelines, power is still being consumed due to register clocking and switching.

Therefore, there is a need for controlling a pipeline of an execution unit in a microprocessor such that when no valid instructions are being executed, the clock to each unused stage in the pipeline is dynamically controlled so that no switching occurs and power is conserved.

SUMMARY OF THE INVENTION

In one embodiment of the present invention, a microprocessor is configured for executing at least one instruction. The microprocessor has a main processor clock. A first stage having one or more storage components is configured for storing operand data of the at least one instruction. The first stage is clocked by at least a first clock derived from the main processor clock. A first combinatorial logic is connected to the first stage for receiving the operand data from the first stage and is configured for processing the operand data and generating first output data. The first clock is operational only during a first period of time when the operand data is processed by the first combinatorial logic. A second stage of one or more storage components is configured for storing the first output data. The second stage is clocked by at least a second clock derived from the main processor clock. A second combinatorial logic is connected to the second stage for receiving the first output data from the second stage and is configured for processing the first output data and generating second output data. The second clock is operational only during a second period of time when the first output data is processed by the second combinatorial logic.

In another embodiment of the present invention, a method is provided for dynamically reducing power consumption in a microprocessor configured for executing at least an instruction. The microprocessor has a main processor clock. Operand data is stored in a first stage of one or more storage components residing in the microprocessor. The first stage is clocked by at least a first clock derived from the main processor clock. The operand data is transmitted from the first stage to a first combinatorial logic residing in the microprocessor. The first clock is operational only during a first period of time when the operand data is processed by the first combinatorial logic. The operand data is processed in the first combinatorial logic. First output data is generated from the first combinatorial logic. The first output data is stored in a second stage of one or more storage components residing in the microprocessor. The second stage is clocked by at least a second clock derived from the main processor clock. The first output data is transmitted from the second stage to a second combinatorial logic residing in the microprocessor. The second clock is operational only during a second period of time when the first output data is processed by the second combinatorial logic. The first output data is processed in the second combinatorial logic. Second output data is generated from the second combinatorial logic. Power consumption is reduced in the microprocessor by dynamically controlling the first and second clocks.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
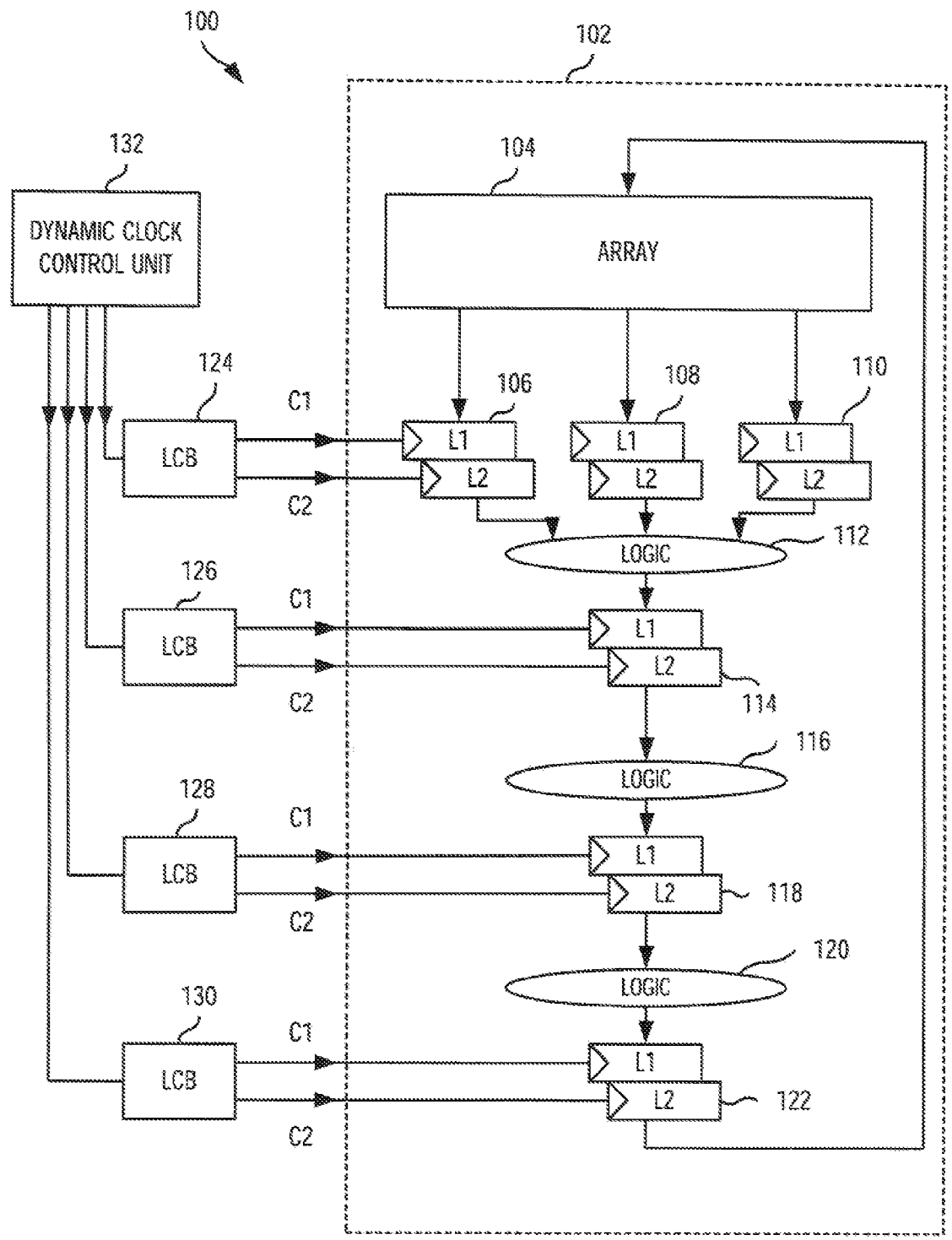
FIG. 1 depicts a high-level block diagram showing one embodiment of the present invention in a processor using master-slave latch design.
Figure 2:
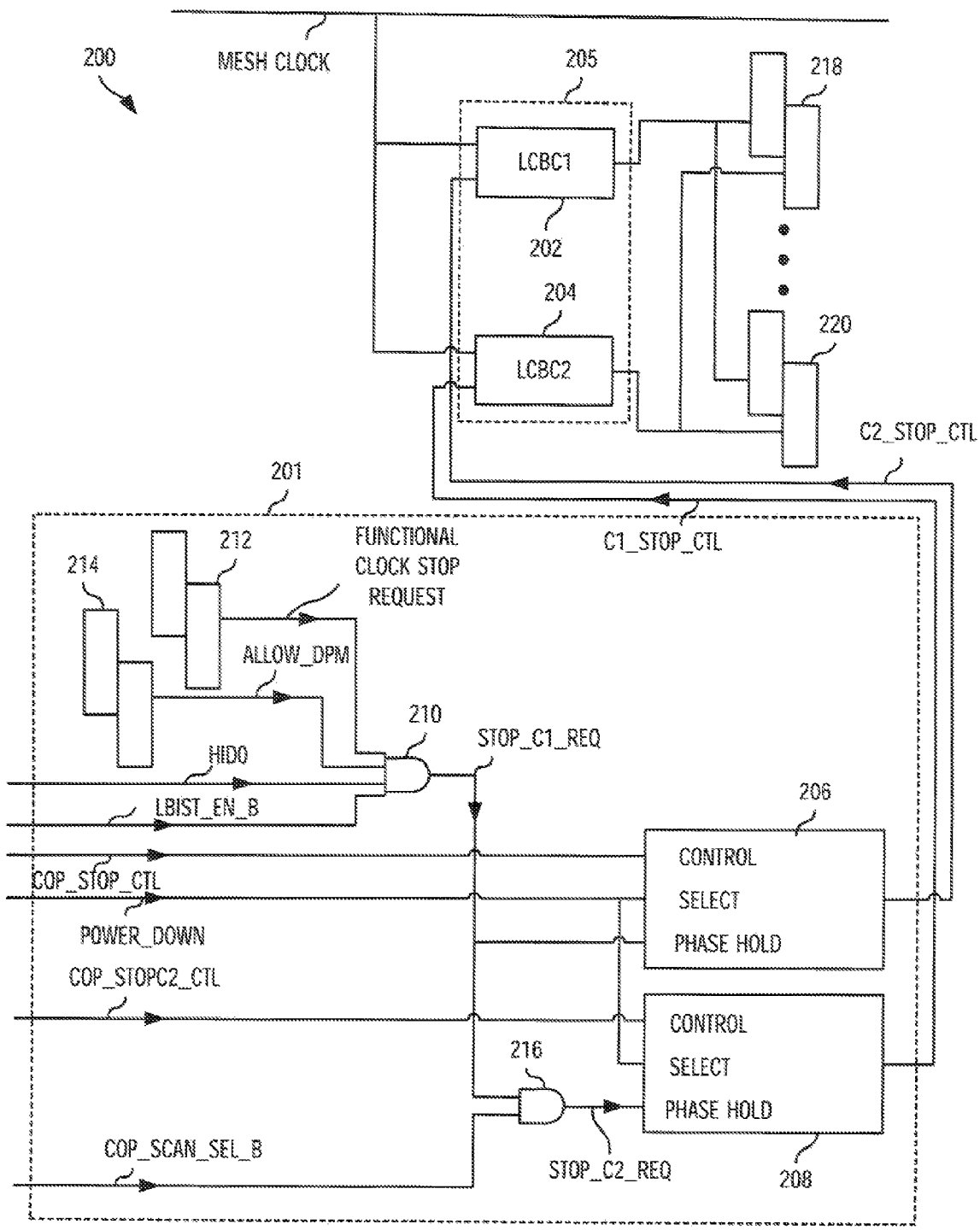
FIG. 2 depicts a block diagram showing a gate-level embodiment of the present invention in a processor using master-slave latch design.
Figure 3:
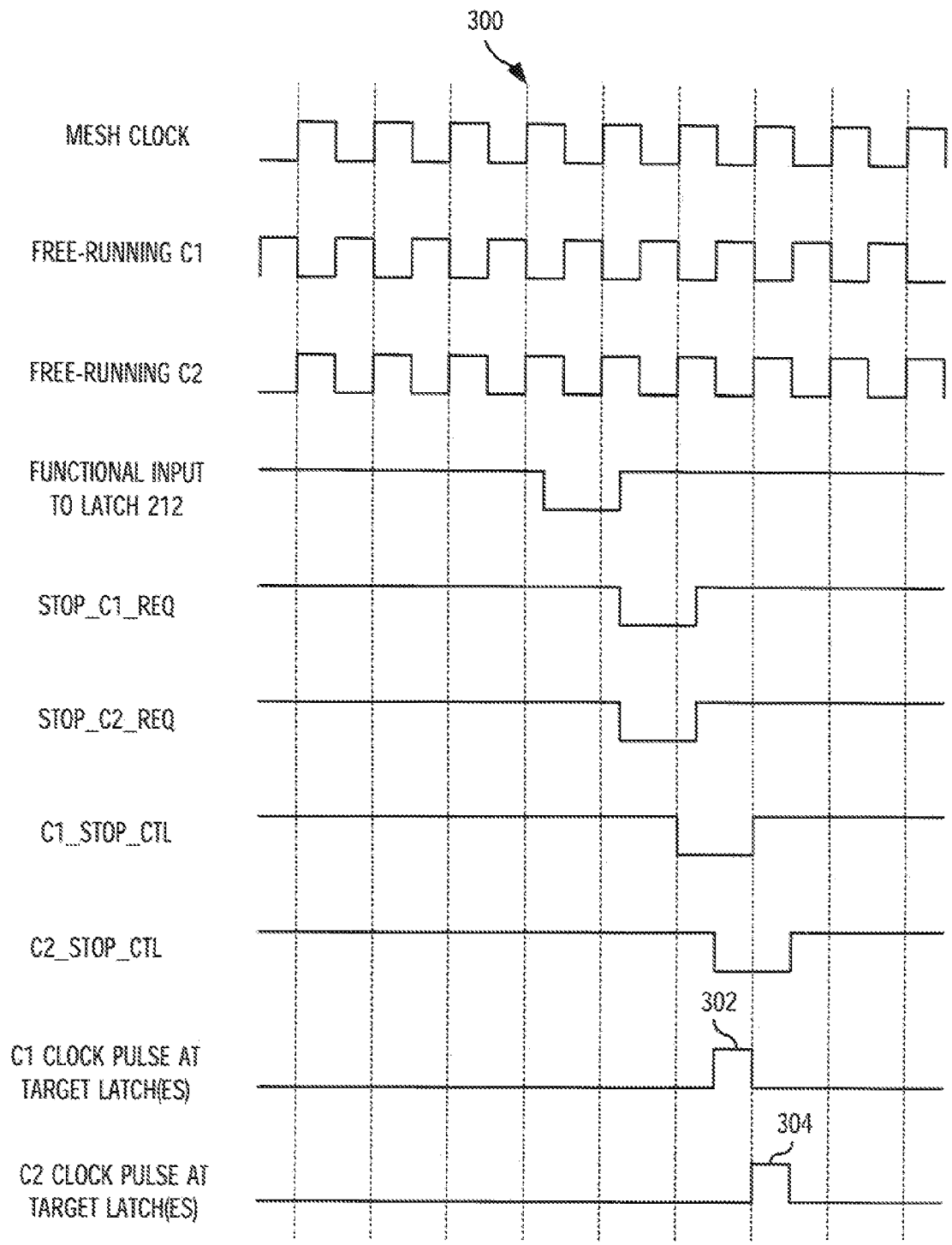
FIG. 3 depicts a timing diagram showing an operation of one embodiment of the present invention as shown in FIG. 1.

The principles of the present invention and their advantages are best understood by referring to the illustrated operations of embodiments depicted in FIGS. 1-3.

In FIG. 1, a reference numeral 100 designates a high-level block diagram showing one embodiment of the present invention in a processor using master-slave latch design. Although the block diagram 100 is specifically applicable to a processor using master-slave latch design, the present invention is also applicable to any other latch designs.

The block diagram 100 includes a dataflow pipeline 102. Preferably, the dataflow pipeline 102 is implemented in an execution unit of a microprocessor. The dataflow pipeline 102 includes an array 104 connected to master-slave latches 106, 108, and 110 for storing the data read from array 104. The array 104 is a storage component within the processor for storing operands used in instructions to be executed in the dataflow pipeline 102. The array 104 is connected to the latches 106, 108, and 110 for providing up to three operands to the latches 106, 108, and 110. Without departing from the true spirit of the present invention, any number of latches may be used, depending on the number of operands to be processed. The latches 106, 108, and 110 are connected to a first combinatorial logic 112 for storing the operand(s) before providing the operand(s) to the first combinatorial logic 112. When one or more operands are provided to the first combinatorial logic 112, a computation is performed therein. The first combinatorial logic 112 is connected to a latch 114 for generating a first output data of the computation and providing the first output data to the latch 114.

The latch 114 is connected to a second combinatorial logic 116 for storing the first output data before providing the first output data to the second combinatorial logic 116. The second combinatorial logic 116 is connected to the latch 118 for generating a second output data and providing the second output data to the latch 118. The latch 118 is connected to a third combinatorial logic 120 for storing the second output data before providing the second output data to the third combinatorial logic 120. The third combinatorial logic 120 is connected to a latch 122 for generating a third output data and providing the third output data to the latch 122. The latch 122 is connected to the array 104 for storing a fourth output data before providing the fourth output data to the array 104.

It is noted that the dataflow pipeline 102 is not limited to this specific configuration. For example, the latches 106, 108, 110, 114, 118, and 122 each may be replaced with a register, which comprises a plurality of latches. Also, additional latch stages may also be added to create deeper pipelines.

The latch 106 is shown to be connected to a first local clock buffer (LCB) 124 for receiving a C1 clock and a C2 clock from a first LCB 124. Although, for the sake of simplicity, the latches 108 and 110 are not shown to be connected to the first LCB 124, both the latches 108 and 110 are similarly connected to the first LCB 124 for receiving the C1 and C2 clocks from the first LCB 124. The C1 clock is directed to the master latch stages of the latches 106, 108, and 110, where as the C2 clock is directed to the slave latch stages of the latches 106, 108, and 110. The latch 114 is connected to a second LCB 126 for receiving the C1 clock and the C2 clock from the second LCB 126. Likewise, the latches 118 and 122 are connected to a third LCB 128 and a fourth LCB 130, respectively, for receiving the C1 clock and the C2 clock. The number of LCBs employed in the block diagram 100 may vary depending on the number of cycles required by instructions processed in the dataflow pipeline 102.

The LCBs 124, 126, 128, and 130 receive a main processor clock (not shown) from which all other clocks, including the C1 and C2 clocks, are derived. The LCBs 124, 126, 128, and 130 are shown to be connected to a dynamic clock-control unit 132 for receiving information on whether to disable the clocks to a corresponding latch or latches. For example, the LCB 124 is connected the dynamic clock-control unit 132 for receiving information on whether to disable the clocks to the latches 106, 108, and 110. Preferably, the dynamic clock-control unit 132 generates an instruction-valid control bit to dynamically control the clock generation performed by the LCBs 124, 126, 128, and 130. For example, by taking the instruction-valid control bit as it travels through the pipelines of a processor, one can enable the clocks to the corresponding pipeline stage as the instruction progresses through the pipelines. If there are no valid instructions for a given cycle, or if the instruction is invalidated through flush mechanisms or load misses, then this signals clock-control drivers (not shown) within the dynamic clock-control unit 132 to stop the clocks. If the instruction is valid, then this triggers the clock-control drivers to turn the clocks back on again. The implementation of the instruction-valid control bit may take many different forms, depending on a particular configuration of the circuitry in the dynamic clock-control unit 132. For example, the LCBs 124, 126, 128, and 130 may be configured to be turned on when the instruction-valid control bit is asserted.

The benefit of this implementation is the power conserved, when no valid instructions are flowing through the pipelines of a processor. The amount of power so conserved may be significant, because valid instructions may not always be flowing through a particular stage of a pipeline. It is noted that different types of latches may be used to implement the present invention, although a particular type of latches is used herein to describe the present invention more clearly.

Referring now to FIG. 2, a block diagram 200 is shown to depict a control logic 201 connected to a master local clock buffer (LCBC1) 202 and a slave local clock buffer (LCBC2) 204. The LCBC1 202 and the LCBC2 204 are included in an LCB 205 to provide the C1 and C2 clocks, respectively. The LCB 205 is equivalent to the LCBs 124, 126, 128, and 130 of FIG. 1. Preferably, the control logic 201 is part of the dynamic clock control unit 132 of FIG. 1 and is responsible for driving one of the LCBs 124, 16, 128, and 130 of FIG. 1. The control logic 201 dynamically controls the LCB 205 depending on the validity of an instruction under process. Also, the LCBC1 202 and LCBC2 204 receive a MESH clock, i.e., a main processor clock from which all other clocks are derived.

The control logic 201 includes two clock-control drivers 206 and 208 configured for generating the aforementioned instruction-valid control bit. The LCBC1 202 is connected to the clock-control driver 206 for receiving a c1_stop_ctl signal from the clock-control driver 206. Similarly, the LCBC2 204 is connected to the clock-control driver 208 for receiving a c2_stop_ctl signal from the clock-control driver 208. The c1_stop_ctl and c2_stop_ctl signals represent stop control signals for C1 and C2 clocks, respectively.

The clock-control drivers 206 and 208 each has a control input, a select input, and a phase hold input. The phase hold input of the clock-control driver 206 is connected to an AND gate 210 for receiving an output signal from the AND gate 210. The AND gate 210 is connected to a latch 212 for receiving a functional clock-stop request signal from the latch 212. The AND gate 210 is also connected to a chicken switch 214 for receiving an allow_dpm signal. The chicken switch 214 comprises latches implemented for functional failsafe overrides. The allow_dpm signal indicates an allow dynamic power management control signal. The AND gate 210 receives two other signals HID0 and lbist_en_b. The HID0 signal indicates a bit signal from a hardware implementation dependent register. The lbist_en_b signal indicates whether the system is currently in a logic built-in self-test (LBIST) mode. In the configuration provided in FIG. 2, the lbist_en_b signal is asserted when the system does not perform an LBIST test. Optionally, the AND gate 210 can have additional input (s) (not shown) for other types of testing such as an autonomous built-in self-test (ABIST) mode.

The phase hold input of the clock-control driver 208 is connected to an AND gate 216 for receiving an output signal from the AND gate 216. The AND gate 216 is connected to the AND gate 210 for receiving an output signal from the AND gate 210. The AND gate 216 also receives a COP_s-can_sel_b signal, which is asserted when the system is not in scan mode. COP stands for common on-board processor. "COP" signals, such as the COP_scan_sel_b signal, are derived from a "pervasive logic" on the chip (i.e., a logic responsible for clock-control of the chip among other things).

The control input of the clock-control driver 206 receives a COP stop control (COP_stop_ctl) signal. The select input of the clock-control driver 206 receives a power_down signal. Both of these inputs to clock-control driver 206 are used to stop the clocks regardless of the value of the instruction-valid control bit. The phase hold input of the clock-control driver 206 receives a stop_c1_req signal, which indicates a request to stop C1 clock signal.

Similarly, the control input of the clock-control driver 208 receives COP C2 phase stop control (COP_stopc2_ctl) signal. The select input of the clock-control driver 208 receives the power_down signal. Both of these inputs to clock-control driver 208 are used to stop the clocks regardless of the value of the instruction-valid control bit. The phase hold input of the clock-control driver 208 receives a stop_c2_req signal, which indicates a request to stop C2 clock signal.

The LCBC1 202 and the LCBC2 204 are connected to a latch 218 for providing the C1 and C2 clocks, respectively, to the latch 218. Likewise, the LCBC1 202 and the LCBC2 204 are connected to a latch 220 for providing the C1 and C2 clocks, respectively, to the latch 220. As indicated in FIG. 2, there may be additional latches (not shown) other than the latches 218 and 220. These additional latches would be similarly connected to the LCBC1 202 and the LCBC2 204. The number of latches receiving the C1 and C2 clocks varies, depending on the configuration of a particular stage of a pipeline. For example, in FIG. 1, there are three latches 106, 108, and 110 receiving the C1 and C2 clocks from the LCB 124. In all the subsequent stages of the dataflow pipeline 102, there is one latch per each stage such as the latches 114, 118, and 122. Therefore, depending on the configuration of a particular stage of a pipeline in which the LCB 205 is located, the number of latches required therein may vary.

The AND gate 210 allows the functional clock-stop request signal to pass through, provided that the chicken switch 214 for that unit is set, the HID0 bit is set, and the system does not perform an LBIST test. The AND gate 216 transfers the stop_c1_req signal to the phase hold input of the clock-control driver 208, provided that the system is not in scan mode. Thus, scan chains can always be shifted regardless of the value of the functional stop request signal.

In FIG. 3, a timing diagram 300 is shown to provide an operation of one embodiment of the invention as shown in FIG. 2. The free-running C1 and C2 clocks are shown to represent the C1 and C2 clocks without the control logic 201. A functional input to the latch 212 is shown to provide an input signal to the latch 212. The stop_c1_req and stop_c2_req signals represent the same signals as shown in FIG. 2. Likewise, the c1_stop$_{13}$ctl and c2_stop_ctl signals represent the same signals as shown in FIG. 2. The C1 clock pulse at a target latch, such as the latches 218 and 220, has a clock pulse 302. The clock pulse 302 represents one clock pulse of the free-running C1 clock, during which the c1_stop_ctl signal is deasserted. Similarly, the C2 clock pulse at target latch has a clock pulse 304. The clock pulse represents one clock pulse of the free-running C2 clock, during which the c2_stop_ctl signal is deasserted. The latches 218 and 220 as shown in FIG. 2 (and possibly some other latches not shown in FIG. 2) are considered target latches.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A method for dynamically reducing power consumption in a microprocessor configured for executing at least an instruction, the microprocessor having a main processor clock, the method comprising the steps of:
   storing operand data in a first stage of one or more storage components residing in the microprocessor, the first stage being clocked by at least a first clock derived from the main processor clock;
   transmitting the operand data from the first stage to a first combinatorial logic residing in the microprocessor, wherein the first clock is operational only during a first period of time when the operand data is processed by the first combinatorial logic;
   processing the operand data in the first combinatorial logic;
   generating first output data from the first combinatorial logic;
   storing the first output data in a second stage of one or more storage components residing in the microprocessor, the second stage being clocked by at least a second clock derived from the main processor clock;
   transmitting the first output data from the second stage to a second combinatorial logic residing in the microprocessor, wherein the second clock is operational only during a second period of time when the first output data is processed by the second combinatorial logic;
   processing the first output data in the second combinatorial logic;
   generating second output data from the second combinatorial logic;
   generating at least two instruction-valid control bits;
   in response to the instruction-valid control bits, reducing power consumption in the microprocessor by dynamically controlling the first and second clocks by selectively disabling at least one local clock buffer to prevent switching of the first clock or the second clock;
   generating a scan mode signal, wherein in response to the scan mode signal, the instruction-valid control bits enable the first clock and the second clock; and
   disabling the first clock by a first instruction-valid control bit in response to a first stop control signal and disabling the second clock by a second instruction-valid control bit in response to a second stop control signal.

2. The method of claim 1, further comprising the steps of:
   transmitting at least the first clock from a first local clock buffer to the first stage only during the first period of time;
   generating the second clock from a second local clock buffer; and
   transmitting at least the second clock from the second local clock buffer to the second stage only during the second period of time.

3. The method of claim 1, further comprising the steps of:
   transmitting at least the first clock from a first local clock buffer to the first stage only during the first period of time;
   generating the second clock by a second local clock buffer;
   transmitting at least the second clock from the second local clock buffer to the second stage only during the second period of time;
   generating a first control signal;
   transmitting the first control signal from the dynamic clock-control unit to at least the first local clock buffer; and
   enabling the first clock signal by the first control signal to be operational only during the first period of time.

4. The method of claim 1, further comprising the steps of:
storing the operand data in an integrated storage component residing in the microprocessor;
transmitting the operand data from the integrated storage component to the first stage; and
transmitting the second output data from the second combinatorial logic to the integrated storage component.

5. The method of claim 1, further comprising the steps of:
transmitting at least the first clock from a first local clock buffer to the first stage only during the first period of time;
generating the second clock from a second local clock buffer;
transmitting at least the second clock from the second local clock buffer to the second stage only during the second period of time;
storing the operand data in an integrated storage component residing in the microprocessor;
transmitting the operand data from the integrated storage component to the first stage; and
transmitting the second output data from the second combinatorial logic to the integrated storage component.

6. The method of claim 1, further comprising the steps of:
transmitting at least the first clock from a first local clock buffer to the first stage only during the first period of time;
generating the second clock from a second local clock buffer;
transmitting at least the second clock from the second local clock buffer to the second stage only during the second period of time;
generating a first control signal by a dynamic clock-control unit residing in the microprocessor;
transmitting the first control signal from the dynamic clock-control unit to at least the first local clock buffer;
using the first control signal to enable the first clock signal to be operational only during the first period of time;
storing the operand data in an integrated storage component residing in the microprocessor;
transmitting the operand data from the integrated storage component to the first stage; and
transmitting the second output data from the second combinatorial logic to the integrated storage component.

* * * * *